J. H. MUMMA.
Straw Cutter.
No. 1,906. Reissued March 21, 1865.
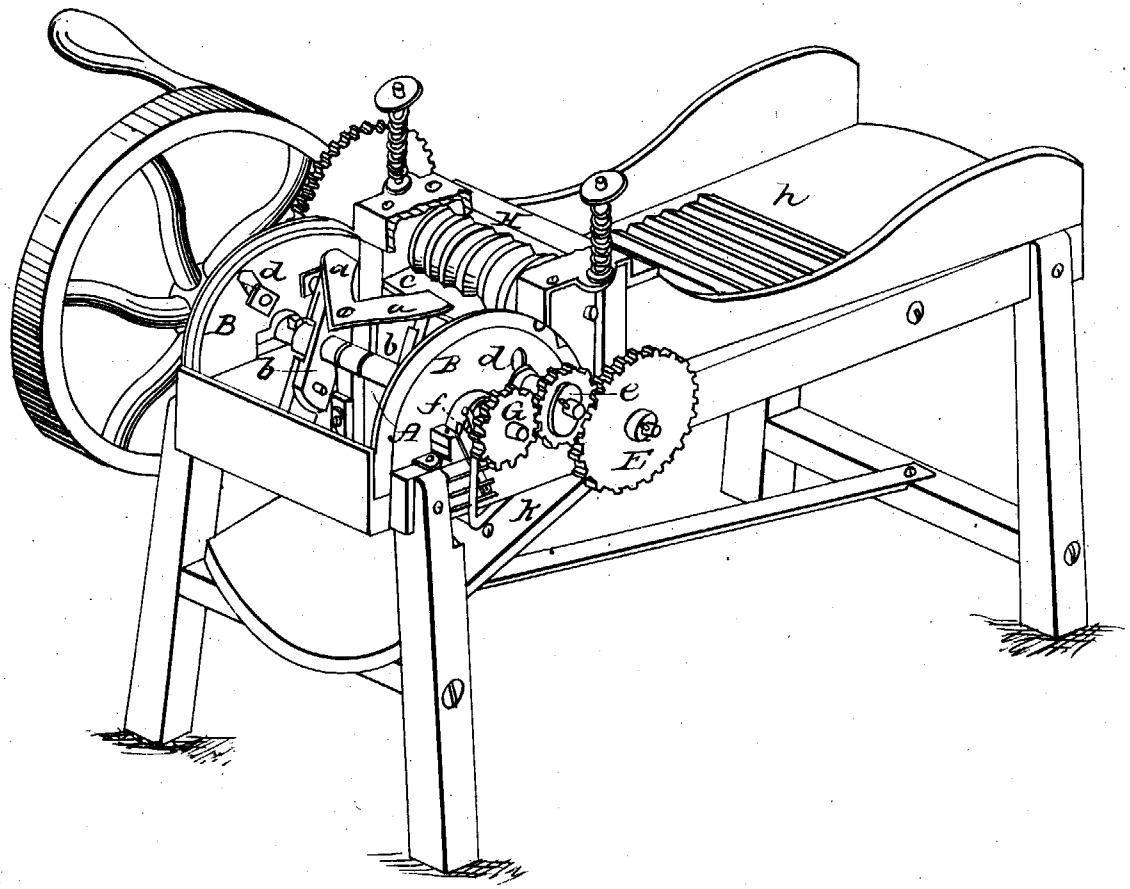
WITNESSES
John F. Clark
H. Dohlers
INVENTOR
J. H. Mumma
N. PETERS. Photo-Lithographer, Washington, D. C.

UNITED STATES PATENT OFFICE.

JACOB H. MUMMA, OF HARRISBURG, PENNSYLVANIA.

IMPROVED STRAW-CUTTER.

Specification forming part of Letters Patent No. 26,046, dated November 8, 1859; Reissue No. 1,906, dated March 21, 1865.

*To all whom it may concern:*

Be it known that I, JACOB H. MUMMA, of Harrisburg, Pennsylvania, did, on the 8th day of November, 1865, obtain Letters Patent of the United States for an Improvement in Straw-Cutters, which Letters Patent I now deem inoperative and invalid by reason of a defective specification; and I do hereby declare the following to be a full, clear, and exact description of the said invention, reference being had to the accompanying drawing, and to the letters of reference marked thereon.

The nature of my invention consists, first, in the employment of cutters or knives of a hawk's-bill form, made susceptible of adjustment, the point of the cutters entering the material and severing the same with a shear-cut, so that comparatively little power is required to effect the operation; second, in a bed of movable slats, by means of which the straw is jostled and moved up toward the feed-rollers and is at the same time deprived of dust and dirt; third, in certain ribbed rollers, which in chaffing corn-stalks split the same lengthwise and in cutting hay or straw separate the same into distinct parcels, and also cause the straw or hay to more effectually resist the lateral draft caused by the shearing action of the cutters; fourth, in certain mechanism, described hereinafter, whereby the machine can be readily adjusted to sever from the straw or other material longer or shorter pieces.

In order to enable others skilled in the art to make and use my invention, I will now proceed to describe its construction and operation.

The figure in the accompanying drawing represents my improved straw-cutter in perspective.

A is a shaft, turning in suitable bearings on the frame of the machine and carrying the cutters *a a*, which are curved and angular in form, and meet in a point, so as to represent a hawk's bill. The cutters are secured to the shaft by means of arms *b* and admit of being adjusted in relation to the fixed cutter-bar C, which is secured at the rear of the head or side plate B B′.

The adjustment of the point and ends of the cutter-blades is effected by means of slotted bars, which can be lengthened or shortened at pleasure and secured after adjustment by set-screws in the arms *b b*.

The fixed cutter-bar C instead of being straight, as usual, is slightly waved on its outer edge, to conform to the circles described by the cutter during its revolution.

To the head B′ is secured a shaft or spindle, carrying a pinion, *e*, the shaft passing through an elongated slot, *d*, in the head, so that it can be adjusted at pleasure. The pinion *e* gears into a wheel, E, in the lower roller of the machine, and also gears into a pinion, G, on one end of the cutter-shaft A, the opposite end of which has a similar pinion gearing into a wheel on the upper roller, H. By this system of gearing the two rollers are made to move in unison with each other. The upper roller turns in fixed bearings, but the lower roller is suspended by stirrup straps, provided with helical springs, so as to permit the lower roller to yield.

It will be observed that the feed-rollers, instead of being plain, as usual, are ribbed, so as to crush and divide the material to be cut.

On one end of the shaft A is a tappet, which operates an arm and rod, *k*, connected with and employed for closing a set of movable slats, *h*, arranged in the bed of the machine, the said slats being thrown open by a suitable spring or springs. These opening and closing slats serve the twofold purpose of feeding the straw or other material toward the rollers and of cleansing the material from dust and dirt.

It is most important that straw-cutting machines should be provided with appliances whereby the straw can be cut of different lengths.

It will be seen that the pinion *e* can be readily withdrawn to make way for another having a greater or less number of teeth, and that the stationery shaft can be readily adjusted in the elongated slot *d* of the head B′ to suit the diameter of the pinion. By this change of pinions the relative speed of the cutters and feed rollers is changed and the length of the severed straws decided.

I claim as my invention and desire to secure by Letters Patent—

1. The hawk's-bill cutters *a a*, in combination with the cutting-bar C of a straw-cutter, the whole being arranged and operating substantially as set forth.

2. The bed of slats *h*, operating for the purpose of feeding the material to the rollers and of cleansing it from dust and dirt, substantially as set forth.

3. The ribbed feed-rollers, in combination with the cutter and cutter-bar C, the whole being arranged substantially as described.

4. The intermediate pinion, *e*, carried by a shaft which is adjusted in the head or side plate of the straw-cutter, in combination with the wheel E on the roller-shaft and pinion G on the cutter-shaft, the whole being arranged and operating substantially as described, for the purpose specified.

In testimony whereof I have signed my name to this specification before two subscribing witnesses.

JACOB H. MUMMA.

Witnesses:
W. KLINE,
I. H. WEISS.